March 18, 1958 W. A. BUSSARD ET AL 2,827,414
PLASTIC MATERIAL AND METHOD OF PREPARING SAME
Filed Aug. 11, 1953 2 Sheets-Sheet 1

INVENTORS
WILLIS A. BUSSARD
HERBERT C. CHAN
BY
ATTORNEY

March 18, 1958 W. A. BUSSARD ET AL 2,827,414
PLASTIC MATERIAL AND METHOD OF PREPARING SAME
Filed Aug. 11, 1953 2 Sheets-Sheet 2
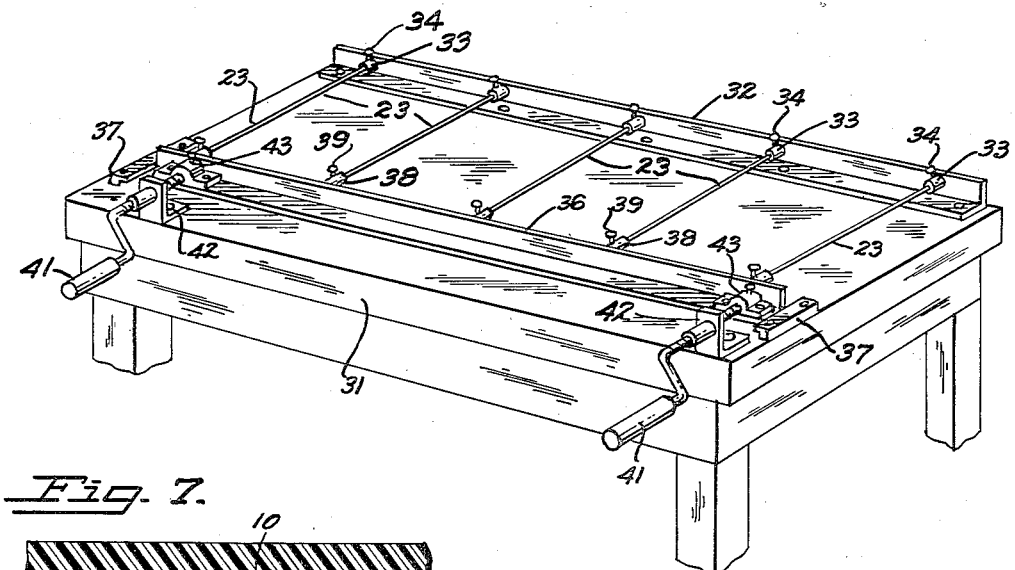
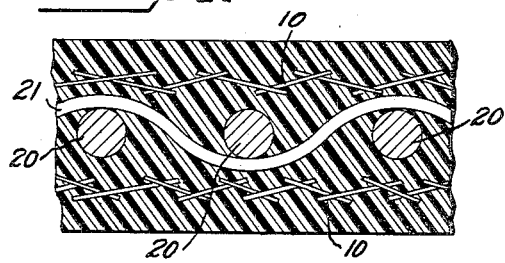
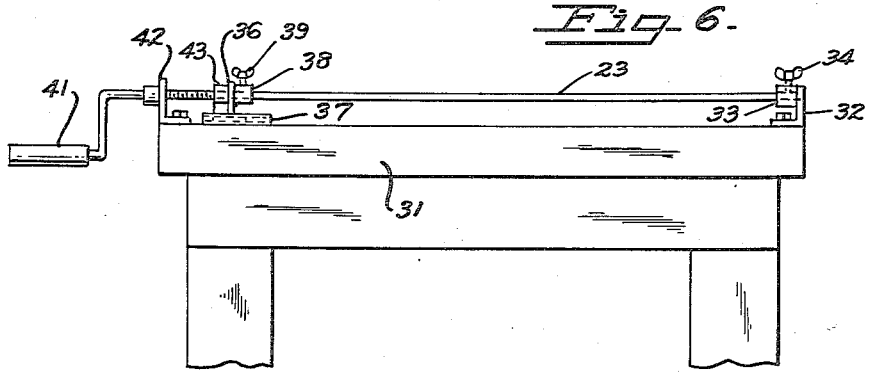
INVENTORS
WILLIS A. BUSSARD
HERBERT C. CHAN
BY
ATTORNEY United States Patent Office 2,827,414
Patented Mar. 18, 1958

2,827,414

PLASTIC MATERIAL AND METHOD OF PREPARING SAME

Willis A. Bussard and Herbert C. Chan, San Francisco, Calif., assignors to Tropi-Sales, San Francisco, Calif., a corporation of California Application August 11, 1953, Serial No. 373,618

6 Claims. (Cl. 154—128)

This invention relates to new and useful improvements in plastic materials and apparatus and methods of preparing same. More particularly this invention relates to a new, decorative, strong material of construction which may be employed in the manufacture of furniture, draperies, screens, partitions, and windows, especially where a transparent or translucent product is desirable.

The distinguishing characteristic of this invention is the employment of a material referred to herein as "woven wood." This material is formed of adjacent, parallel, strips of wood or filaments of reed, bamboo or synthetic substitutes therefor, usually round or elliptic and substantially uniform in cross-section, held together by transverse, relatively widely spaced threads of the same or contrasting color. Such threads may be of natural or synthetic fibers or thin metal wires. The wood may be painted any deisred color, or may retain its natural color, and by spacing the threads a pattern may be obtained, thus enhancing the ornamental effect and affecting the light-transmitting qualities of the completed article. Woven wood finds present application for draperies, roll-up window screens, and similar uses.

The woven wood is bonded between two layers of plastic material or bonded on top of a single layer, the plastic preferably being clear and transparent or translucent. The resulting product has extremely desirable characteristics, having greatly increased strength over ordinary plastic sheets. In addition, the ornamental effect is enhanced because the pattern and color of the woven wood is visible in the completed article.

The completed article may be formed in flat sheets or may be corrugated, it being unde rstood that the size, thickness and surface ornamentation of the sheets are dependent upon the surface identations of the plate and bed of the press in which the plastic is bonded.

The invention may also be adapted to the formation of pre-stressed sheets. Thus thin metallic rods may be substituted for strips or filaments of wood in the woven wood at spaced intervals of, for example, six inches. The metallic rods are stressed prior to bonding of the woven wood in the plastic by subjection to tension and the stress continued during the pressing operation and until the resin has set. Thus the completed sheet is pre-stressed.

In the drawings:

Fig. 5 is a perspective of apparatus for pre-stressing the woven wood installed on the bed of a press.

Fig. 6 is an end elevation of the apparatus of Fig. 5.

Fig. 7 is an enlarged fragmentary sectional view of a portion of Fig. 2.

Figure 4:
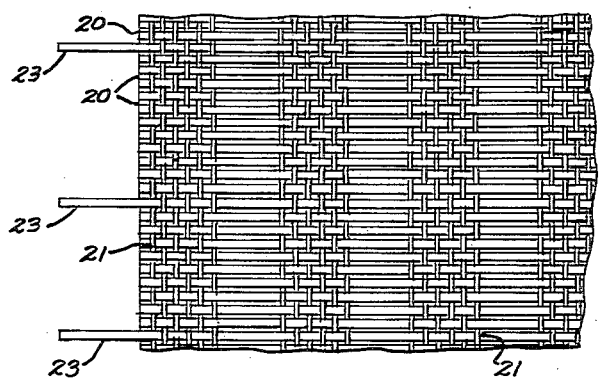
Fig. 4 is a plan of a portion of a sheet of woven wood prior to bonding.

The present invention employs in its construction a material known as "woven wood." As has heretofore been described, this material comprises strips or filaments of thin wood, bamboo or reed, or synthetic substitutes therefor designated by reference numeral 20 and threads 21 running in the opposite direction. As shown in Fig. 4, by spacing the threads a pattern may be obtained. As hereinafter appears, certain of the filaments 20 may be replaced with thin rods 23 which may be stressed prior to bonding in the plastic. The rods may be spaced apart a suitable distance, such as six inches. Preferably the rods are painted the same color as the filaments 20.

The woven wood is preferably first dried in an oven to drive out moisture. It may then be impregnated with a plastic resin to seal off the wood and prevent undesirable oils native to the wood from bleeding out into the final product. Any suitable wood sealer may be used for the latter purpose.

The woven wood is then bonded on top of a single layer of plastic or laminated between two layers 26. Preferably the plastic is a clear material so that the pattern and color of the woven wood will be visible. The plastic is reinforced by mats of glass fiber (not shown in the accompanying drawings) which give strength to the product, the mats of glass fiber being initially encased in cellophane envelopes or bags which later disintegrate during the pressing operaiton.

Although a variety of plastics may be employed, a preferred material is a polyester resin. By this is meant an unsaturated linear alkyd-type polymer dissolved in a polymerizable monomer. The product is prepared by curing the solution with a catalyst. A typical polyester resin may be prepared from maleic anhydride and ethylene glycol.

Figure 2:
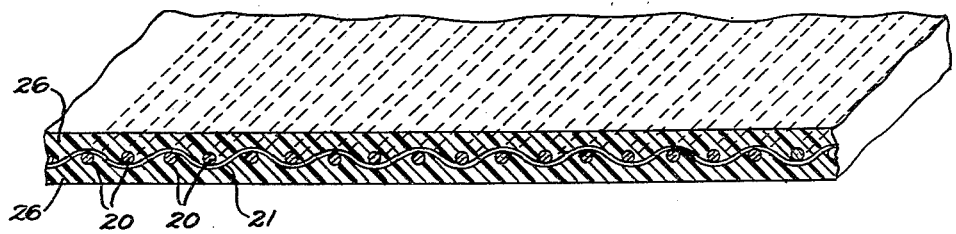
Fig. 2 is a perspective of a portion of a sheet of material wherein woven wood is bonded between layers of plastic.

In carrying out the process to form the material shown in Fig. 2, a mat 10 of glass fiber, encased in cellophane, is placed on the bed of the press. The woven wood is then placed on top of the glass mat and a second glass mat 10 placed on top of the woven wood. The plastic resin is then injected into the press and heat and pressure applied until the resin has cured and allowed to set. It will be found that a clear, strong, highly decorative material is produced.

Figure 1:
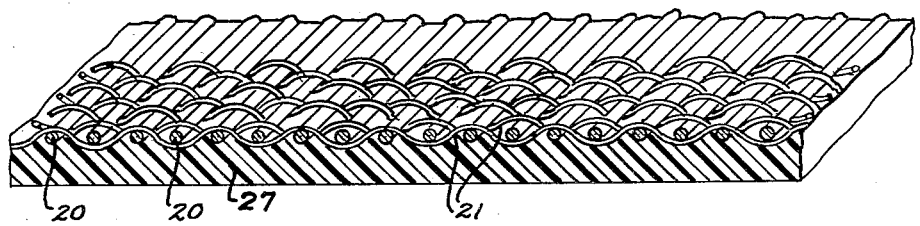
Fig. 1 is a perspective of a portion of a sheet of material wherein woven wood is bonded on top of a layer of plastic resin.

To form the material shown in Fig. 1, the top mat is eliminated and the resin injected only under the level of the woven wood.

The invention has particular application where a pre-stressed sheet is desired. Metal rods 23 are substituted for at least some of the filaments 20 and the ends of these rods project beyond the margin of the filaments 20 (see Fig. 4). Such rods 23 may be subjected to stress prior to bonding. Whereupon, after the plastic has been set, the sheet of material is pre-stressed, which makes it useful in certain types of applications.

One means for pre-stressing the rods 23 is illustrated in Figs. 5 and 6. Reference numeral 31 designates schematically the lower bed of a press in which the plastic is to be cured. Mounted along one edge of the press is an angle bar 32 to which, at intervals, are attached sleeves 33 fitted with thumbscrews 34. The rods which are spaced throughout the woven wood are received in the sleeves 33 and clamped against axial movement by the thumbscrews 34.

On the opposite side of the press is a moveable angle bar 36 supported for transverse movement in guides 37. Moveable bar 36 carries sleeves 38 fitted with thumbscrews 39, the sleeves 33 and 38 on the opposite bars 32 and 36 being horizontally opposed. Thus one end of each rod 23 is prestressed by pulling sleeves 33 and 38 apart. One means for accomplishing this result is to mount a pair of cranks 41 on table 31 by means of brackets 42, one adjacent each end. The inner end of each crank is threaded and received in a nut 43 fixed to angle bar 36. By turning cranks 41, the angle bar 36 may be moved away from angle bar 32, thereby stretching and stressing each of the rods 23 held by sleeves 33 and 38.

For purpose of clarity, only the spaced metallic rods 23 which are subjected to stress are illustrated in Figs. 5 and 6, it being understood that such rods are slightly longer than the filaments 20 making up the rest of the woven wood, the extra length of the metallic rods being for the purpose of being gripped in the sleeves.

After the rods have been stressed, the top plate of the press (not shown) applies pressure to the plastic resin, glass mats and woven wood, thereby laminating the woven wood between layers of plastic material. After the plastic has set in position, the tension is removed from the rods, but since the rods are now bonded within the plastic, the entire plastic sheet is pre-stressed.

Figure 3:
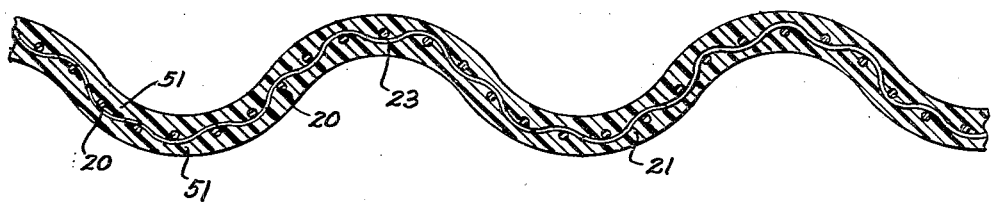
Fig. 3 is an end elevation of a sheet of material similar to that illustrated in Fig. 2 and wherein the sheet is corrugated.

To form the corrugated material illustrated in Fig. 3, the upper and lower plates of the press are formed with corresponding corrugations. Plastic layers 51 are laminated above and below the woven wood. It will be understood that some of the filaments 20 in the corrugated material may be replaced with metal rods 23 and the rods subjected to tension as has been described in order to pre-stress the material.

What is claimed is:

1. A material of construction comprising a layer of woven wood comprising parallel thin wood strips and interwoven transverse threads, a layer of polyester resin at least partially embedded into at least one of the wide surfaces of said woven wood, and a mat of glass fibers bonded within said layer of polyester resin, said polyester resin being clear and transparent.

2. A material of construction comprising a layer of woven wood comprising parallel thin wood strips and interwoven transverse threads, a layer of polyester resin at least partially embedded into at least one of the wide surfaces of said woven wood, and a mat of glass fibers bonded within said layer of polyester resin.

3. A material of construction comprising a layer of woven material in which some of the filaments comprise wooden rods and some of the filaments comprise thin metal rods parallel to said wooden rods and in which are provided interwoven transverse threads, said rods being pre-stressed under tension, a layer of polyester resin at least partially embedded in at least one of the wide surfaces of said woven wood, and a mat of glass fibers bonded within said layer of polyester resin.

4. A method of forming a material of construction comprising positioning a layer of glass mat and a superposed layer of woven wood comprising parallel thin wood strips and interwoven transverse threads, injecting polyester resin within the glass mat and along the undersurface of said woven wood, applying heat and pressure to said mat, resin and woven wood, and holding said heat and pressure until said resin is bonded to said woven wood.

5. A method of forming a material of construction comprising positioning a layer of woven wood comprising parallel thin wood strips and interwoven transverse threads between two layers of glass mat, injecting polyester resin within the glass mats and along the surfaces of said woven wood, applying heat and pressure to said mats, resin and woven wood, and holding said heat and pressure until said resin is bonded to said woven wood.

6. A method of forming pre-stressed material of construction comprising positioning a layer of woven material in which some of the filaments are wooden rods and some of the filaments are parallel metal rods and interwoven transverse threads between layers of glass mat, applying tension to at least some of the metal rods to stress same, injecting polyester resin within the glass mats and along the surfaces of said wooden rods, metal rods and threads, applying heat and pressure, holding said heat and pressure until said resin is bonded to said wooden rods and metal rods, and releasing the tension on said metal rods.

References Cited in the file of this patent

UNITED STATES PATENTS

| | | |
|---|---|---|
| 361,687 | Gardner | Apr. 26, 1887 |
| 1,350,271 | Arnold | Aug. 17, 1920 |
| 2,126,711 | Atwood | Aug. 16, 1938 |
| 2,197,132 | Lougheed | Apr. 16, 1940 |
| 2,319,105 | Billner | May 11, 1943 |
| 2,350,729 | Crouet | June 6, 1944 |
| 2,373,738 | Atwood | Apr. 17, 1945 |
| 2,428,325 | Collins | Sept. 30, 1947 |
| 2,571,717 | Howald | Oct. 16, 1951 |
| 2,633,440 | Scholl | Mar. 31, 1953 |
| 2,637,895 | Blaton | May 12, 1953 |
| 2,639,248 | Overholt | May 19, 1953 |
| 2,644,781 | Smolak | July 7, 1953 |
| 2,650,184 | Biefeld | Aug. 25, 1953 |
| 2,715,596 | Hawley | Aug. 16, 1955 |